(12) United States Patent
Schubert et al.

(10) Patent No.: US 10,502,565 B2
(45) Date of Patent: Dec. 10, 2019

(54) LEVELING AND POSITIONING SYSTEM AND METHOD

(71) Applicant: OTL DYNAMICS LLC, Vashon Island, WA (US)

(72) Inventors: Richard S. Schubert, Vashon Island, WA (US); Robert P. Donker, Burton, WA (US)

(73) Assignee: OTL DYNAMICS LLC, Vashon Island, WA (US)

( * ) Notice: Subject to any disclaimer, the term of this patent is extended or adjusted under 35 U.S.C. 154(b) by 0 days.

(21) Appl. No.: 16/154,433

(22) Filed: Oct. 8, 2018

(65) Prior Publication Data
US 2019/0041206 A1  Feb. 7, 2019

Related U.S. Application Data

(63) Continuation-in-part of application No. 15/900,659, filed on Feb. 20, 2018, which is a continuation-in-part of application No. 15/259,997, filed on Sep. 8, 2016, now Pat. No. 9,909,867, which is a continuation-in-part of application No. 14/259,865, filed on Apr. 23, 2014, now Pat. No. 9,464,895, which is a continuation-in-part of application No. 13/212,989, filed on Aug. 18, 2011, now Pat. No. 8,959,784, which is a continuation-in-part of application No. 12/724,326, filed on Mar. 15, 2010, now Pat. No. 8,006,397.

(Continued)

(51) Int. Cl.
*G01C 9/02* (2006.01)
*G01C 9/06* (2006.01)
*G01C 9/28* (2006.01)

(52) U.S. Cl.
CPC ............ *G01C 9/02* (2013.01); *G01C 9/06* (2013.01); *G01C 9/28* (2013.01)

(58) Field of Classification Search
CPC .................................... G01C 9/02; G01C 9/06
USPC ........ 33/371, 366.27, 372, 373, 366.11, 379, 33/381, 382
See application file for complete search history.

(56) References Cited

U.S. PATENT DOCUMENTS 312,266 A    2/1885  Gurley
986,783 A    3/1911  Tschop
(Continued)

OTHER PUBLICATIONS

U.S. Appl. No. 12/724,326, filed Mar. 15, 2010.
(Continued)

*Primary Examiner* — Christopher W Fulton
(74) *Attorney, Agent, or Firm* — Davis Wright Tremaine LLP

(57) ABSTRACT

A level housing that includes a level housing body that extends along an axis X and includes an axis of symmetry about an axis Y that is perpendicular to the axis X; a first and second flange and a web that extends between the flanges, the first flange comprising a pair of first arms that extend from the web and the first arms defining a coupling slot that includes coupling faces and a channel, the first flange and first arms and second flange being symmetrical about axis Y, the second flange including a pair of second arms; and a plurality of coupling sockets defined by a portion of the web and flanges, the coupling sockets including a respective cavity that extends between the flanges.

19 Claims, 15 Drawing Sheets

Related U.S. Application Data

(60) Provisional application No. 61/159,968, filed on Mar. 13, 2009, provisional application No. 62/343,619, filed on May 31, 2016, provisional application No. 62/569,263, filed on Oct. 6, 2017.

(56) References Cited

U.S. PATENT DOCUMENTS

| | | | | |
|---|---|---|---|---|
| 1,380,407 | A | 6/1921 | Nelson | |
| 1,794,254 | A | 2/1931 | Sherwood | |
| 1,908,496 | A | 5/1933 | Hunter | |
| 2,314,927 | A | 3/1943 | Farrington | |
| 2,535,791 | A | 12/1950 | Fluke | |
| 2,575,697 | A | 11/1951 | Willis | |
| 2,647,712 | A | 8/1953 | Sandmoen | |
| 2,755,561 | A | 7/1956 | LaFosse | |
| 2,789,363 | A * | 4/1957 | Miley | G01C 9/24 33/347 |
| 2,824,381 | A | 2/1958 | Traupmann | |
| 3,368,287 | A | 2/1968 | Ault | |
| 3,545,091 | A * | 12/1970 | Martin | G01C 9/34 33/372 |
| 3,707,772 | A | 1/1973 | Cotter | |
| 3,820,249 | A * | 6/1974 | Stone | G01C 9/24 33/347 |
| 4,141,151 | A | 2/1979 | Jansky | |
| 4,154,001 | A | 5/1979 | Serafin | |
| 4,168,578 | A | 9/1979 | VanderWerf | |
| 4,295,279 | A | 10/1981 | Sienknecht | |
| 4,333,244 | A | 6/1982 | Bailey | |
| 4,393,599 | A | 7/1983 | Sterrenberg | |
| 4,402,141 | A | 9/1983 | Sterrenberg | |
| 4,564,322 | A | 1/1986 | Stapley | |
| 4,593,475 | A | 6/1986 | Mayes | |
| 4,625,423 | A * | 12/1986 | Sackett | G01C 9/06 33/366.16 |
| 4,663,856 | A | 5/1987 | Hall et al. | |
| 4,953,475 | A | 9/1990 | Munach et al. | |
| 4,976,040 | A | 12/1990 | Mish et al. | |
| 4,996,777 | A * | 3/1991 | Grosz | G01C 9/28 33/379 |
| 5,031,329 | A | 7/1991 | Smallidge | |
| 5,109,609 | A | 5/1992 | Anderson | |
| 5,255,443 | A | 10/1993 | Schmidt | |
| 5,388,337 | A | 2/1995 | Powers, II | |
| 5,421,094 | A * | 6/1995 | McCord | G01C 9/28 33/371 |
| 5,442,864 | A | 8/1995 | Erman | |
| 5,531,031 | A | 7/1996 | Green | |
| 5,581,900 | A | 12/1996 | Payne | |
| 5,594,669 | A | 1/1997 | Heger | |
| 5,749,151 | A | 5/1998 | Scott et al. | |
| 5,813,125 | A | 9/1998 | Byrn | |
| 5,992,033 | A | 11/1999 | Scarborough | |
| 5,996,238 | A | 12/1999 | Yonke | |
| 6,029,359 | A * | 2/2000 | Szumer | G01C 9/28 33/373 |
| 6,182,916 | B1 | 2/2001 | Lin | |
| 6,279,239 | B1 | 8/2001 | Astudillo | |
| 6,354,011 | B1 | 3/2002 | Albrecht | |
| 6,438,854 | B1 | 8/2002 | Kott, Jr. | |
| 6,442,853 | B1 | 9/2002 | Hale et al. | |
| 6,502,322 | B2 | 1/2003 | Smochek | |
| 6,640,456 | B2 | 11/2003 | Owoc et al. | |
| 6,655,883 | B2 | 12/2003 | Maar | |
| 6,675,490 | B1 * | 1/2004 | Krehel | G01C 9/26 33/365 |
| 6,836,972 | B2 | 1/2005 | Drahos et al. | |
| 6,898,860 | B2 | 5/2005 | Wu | |
| 6,915,587 | B1 | 7/2005 | Scillia et al. | |
| 6,915,588 | B1 * | 7/2005 | Gay | G01C 9/28 33/382 |
| 6,918,187 | B2 | 7/2005 | Schaefer | |
| 7,117,606 | B2 | 10/2006 | Brown | |
| 7,182,148 | B1 | 2/2007 | Szieff | |
| 7,237,341 | B2 | 7/2007 | Murray | |
| 7,389,591 | B2 | 6/2008 | Jaiswal et al. | |
| 7,513,055 | B2 | 4/2009 | Montgomery | |
| 7,644,506 | B2 | 1/2010 | Wong | |
| 7,726,039 | B2 | 6/2010 | Lee et al. | |
| 7,743,520 | B1 * | 6/2010 | Jiorle | G01C 9/28 33/366.11 |
| 7,752,763 | B2 | 7/2010 | Yamamoto | |
| 7,874,077 | B2 | 1/2011 | Borinato | |
| 8,006,397 | B2 | 8/2011 | Schubert | |
| 8,336,221 | B2 | 12/2012 | Steele et al. | |
| 8,484,856 | B1 | 7/2013 | Webb et al. | |
| 8,959,784 | B2 | 2/2015 | Schubert | |
| 9,114,494 | B1 | 8/2015 | Mah | |
| 9,144,875 | B2 | 9/2015 | Schlesak et al. | |
| 9,464,895 | B2 | 10/2016 | Schubert et al. | |
| 9,909,867 | B2 * | 3/2018 | Schubert | G01C 9/10 |
| 2002/0133959 | A1 | 9/2002 | Bone et al. | |
| 2004/0182587 | A1 | 9/2004 | May et al. | |
| 2004/0216314 | A1 | 11/2004 | Ch Fung et al. | |
| 2005/0044738 | A1 | 3/2005 | Adams et al. | |
| 2005/0159840 | A1 | 7/2005 | Lin et al. | |
| 2005/0171714 | A1 | 8/2005 | Ely et al. | |
| 2005/0262717 | A1 | 12/2005 | Chen | |
| 2006/0064888 | A1 * | 3/2006 | Chen | G01C 9/10 33/365 |
| 2007/0045010 | A1 | 3/2007 | Kasperek | |
| 2007/0079516 | A1 | 4/2007 | Eckstein et al. | |
| 2007/0130785 | A1 | 6/2007 | Bublitz et al. | |
| 2007/0180720 | A1 | 8/2007 | Gorgone | |
| 2010/0032179 | A1 | 2/2010 | Hanspers et al. | |
| 2010/0300713 | A1 | 12/2010 | Kume et al. | |
| 2010/0325906 | A1 * | 12/2010 | Yowonske | G01C 9/26 33/366.27 |
| 2012/0168189 | A1 | 7/2012 | Eckert | |
| 2014/0007442 | A1 | 1/2014 | Pettersson et al. | |
| 2014/0019083 | A1 | 1/2014 | Nakaoka | |
| 2014/0075768 | A1 | 3/2014 | Schubert et al. | |
| 2014/0085144 | A1 | 3/2014 | Krapf et al. | |
| 2014/0166323 | A1 | 6/2014 | Cooper | |
| 2015/0014004 | A1 | 1/2015 | Schubert et al. | |
| 2015/0041164 | A1 | 2/2015 | Sergyeyenko et al. | |
| 2015/0042247 | A1 | 2/2015 | Kusakawa | |
| 2015/0309640 | A1 | 10/2015 | Vuckovic | |
| 2015/0352713 | A1 | 12/2015 | Takazakura et al. | |
| 2016/0054124 | A1 | 2/2016 | Schaefer | |
| 2017/0201853 | A1 | 7/2017 | Chen et al. | |

OTHER PUBLICATIONS

U.S. Appl. No. 13/212,989, filed Aug. 18, 2011.
U.S. Appl. No. 13/623,781, filed Sep. 20, 2012.
U.S. Appl. No. 14/259,865, filed Apr. 23, 2014.
U.S. Appl. No. 15/259,997, filed Sep. 8, 2016.
U.S. Appl. No. 15/900,659, filed Feb. 20, 2018.
U.S. Appl. No. 14/497,986, filed Sep. 26, 2014.
U.S. Appl. No. 15/610,357, filed May 31, 2017.
Bennett, G. Bradley, Reasons for Allowance in parent case (U.S. Appl. No. 13/623,781), dated Jun. 19, 2014, p. 2.
USPTO, Office Action dated Mar. 24, 2011 for U.S. Appl. No. 12/724,326, filed Mar. 15, 2010.
USPTO, Office Action dated May 29, 2013 for U.S. Appl. No. 13/212,989, filed Aug. 18, 2011.

* cited by examiner

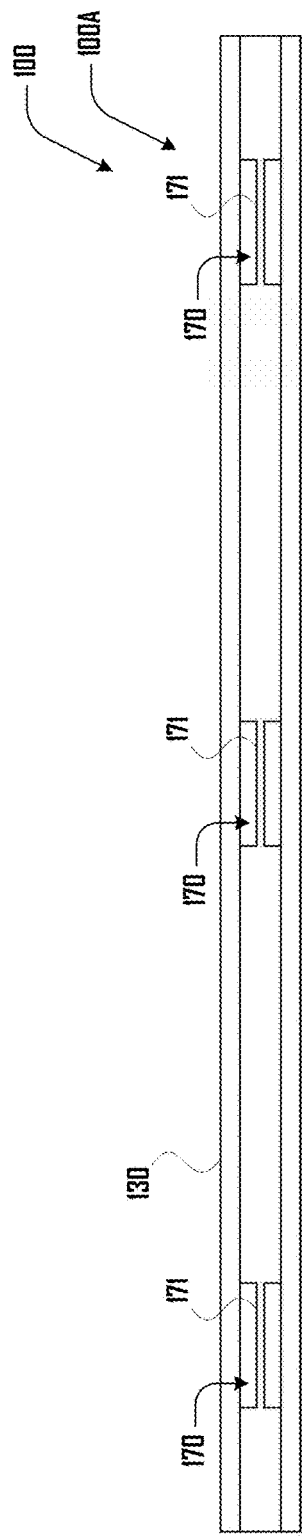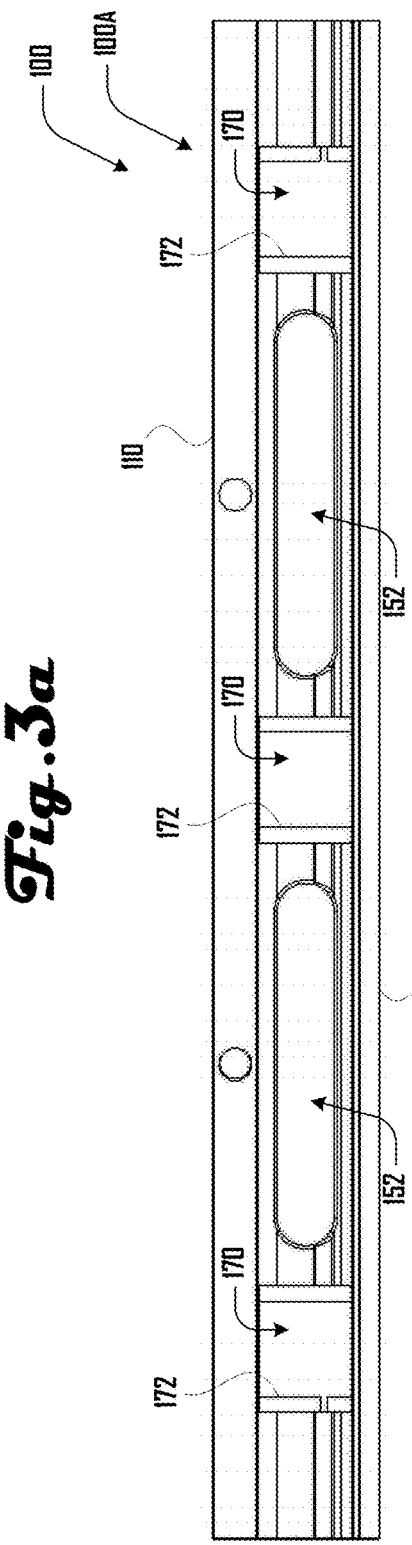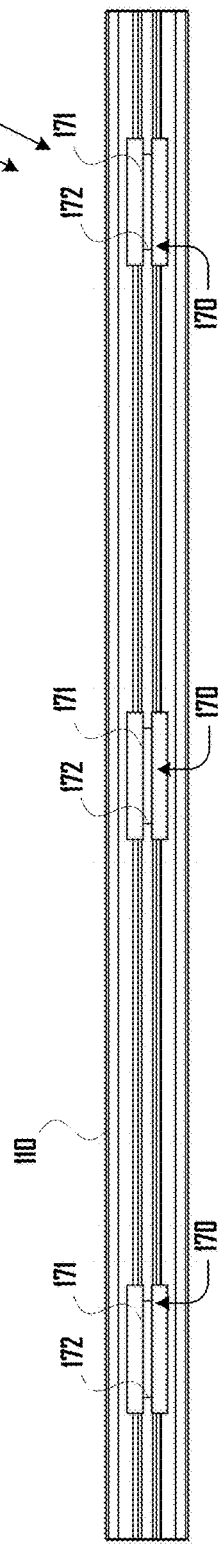

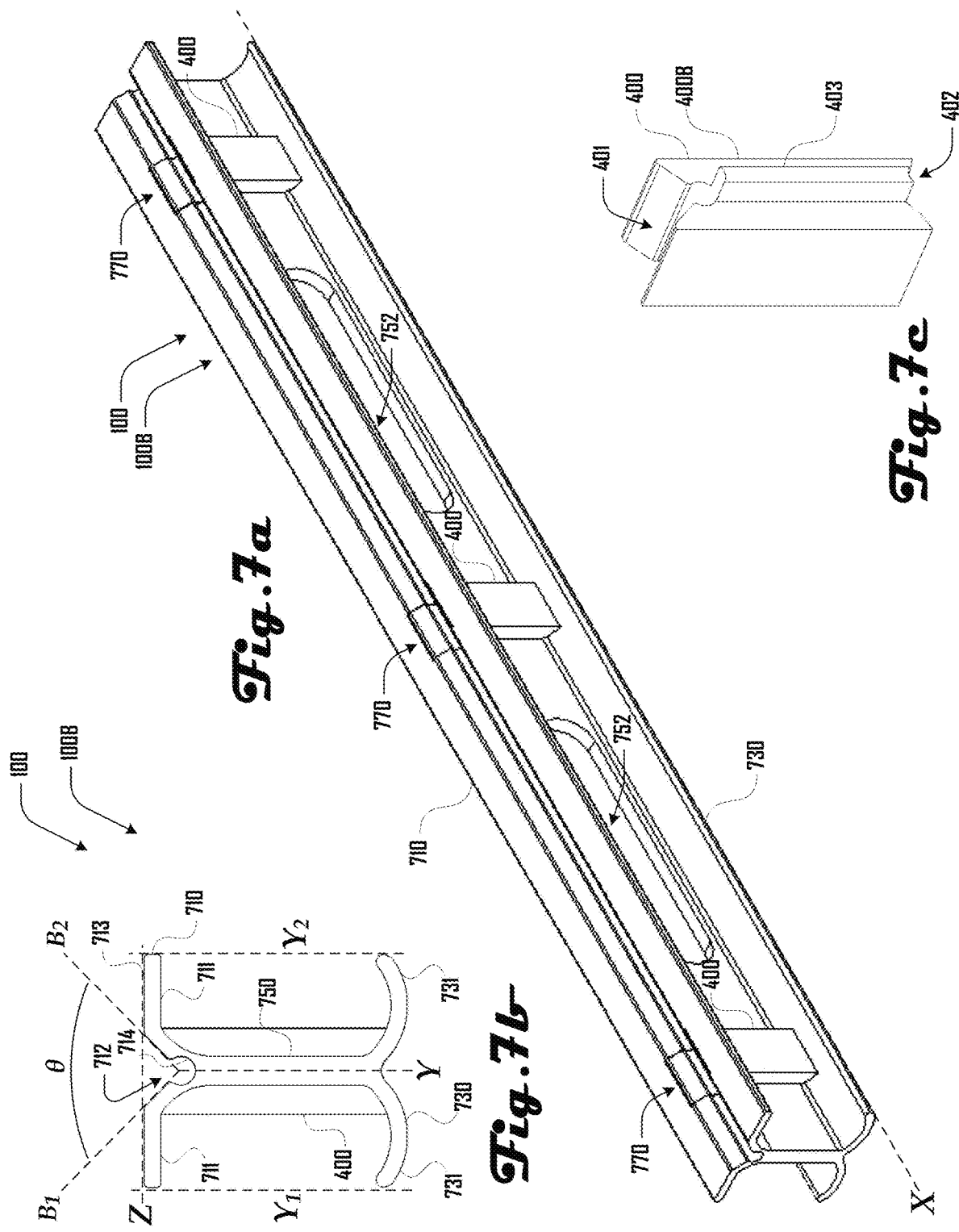

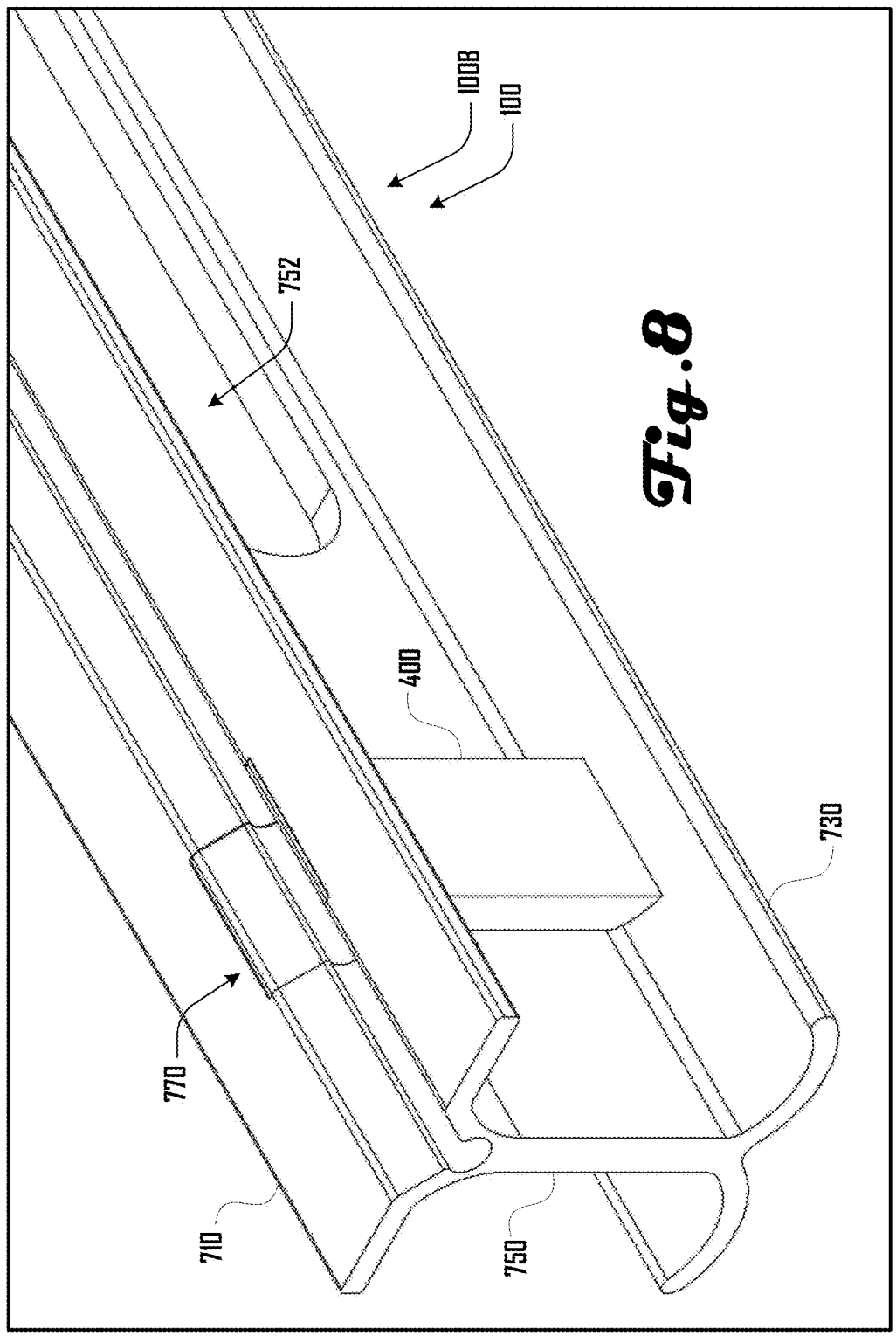

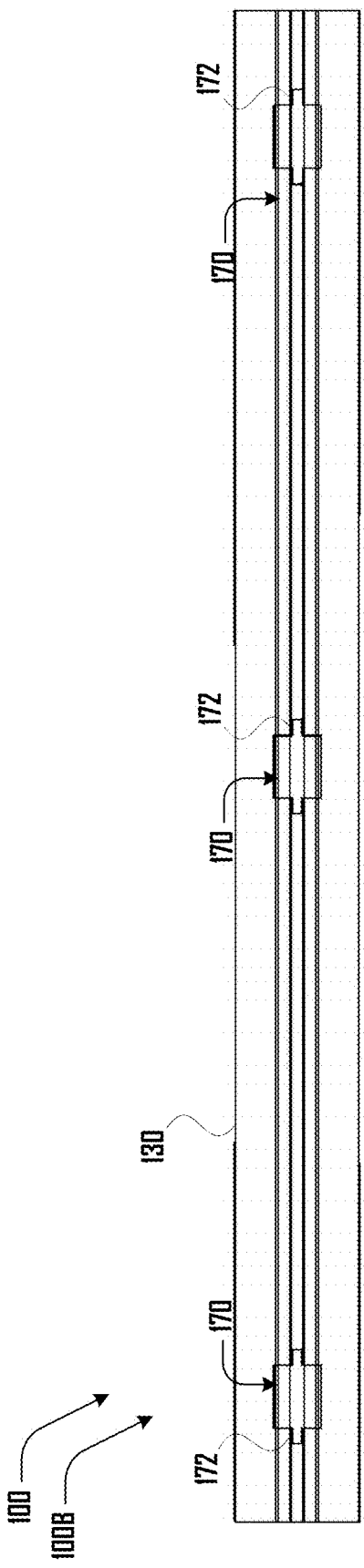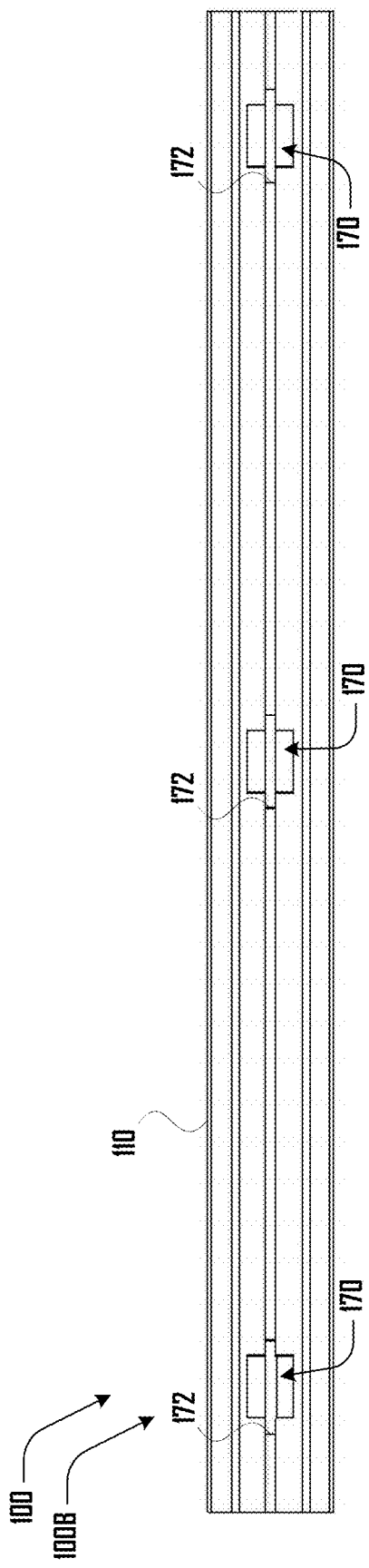

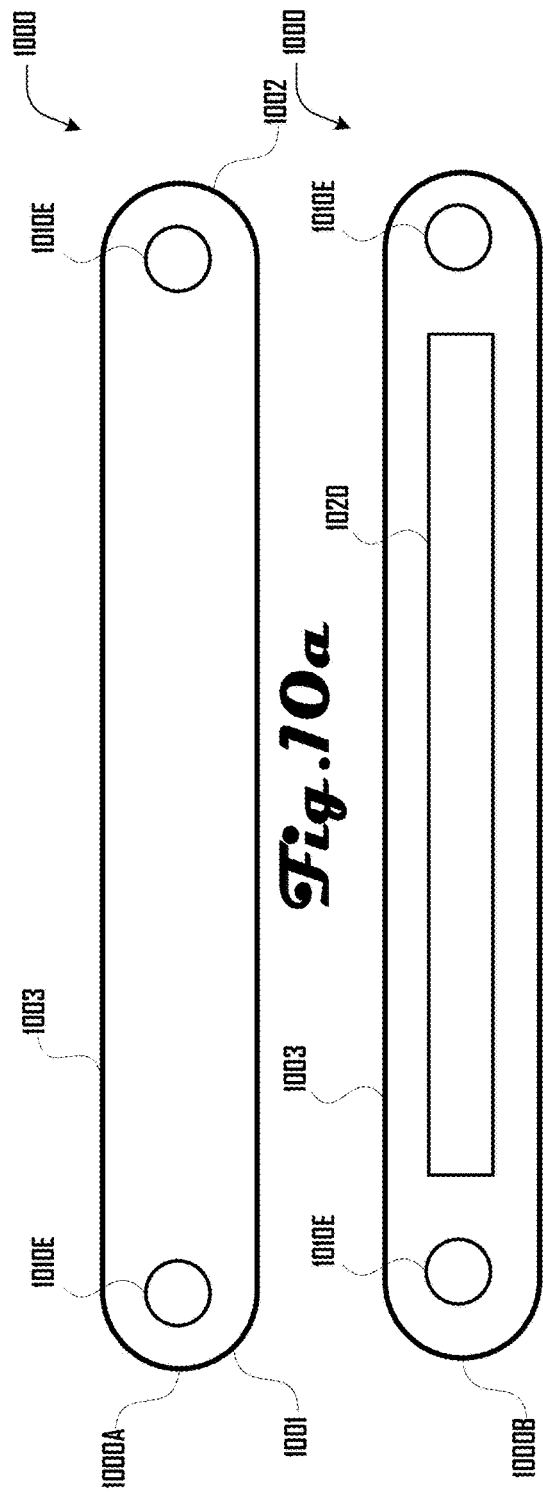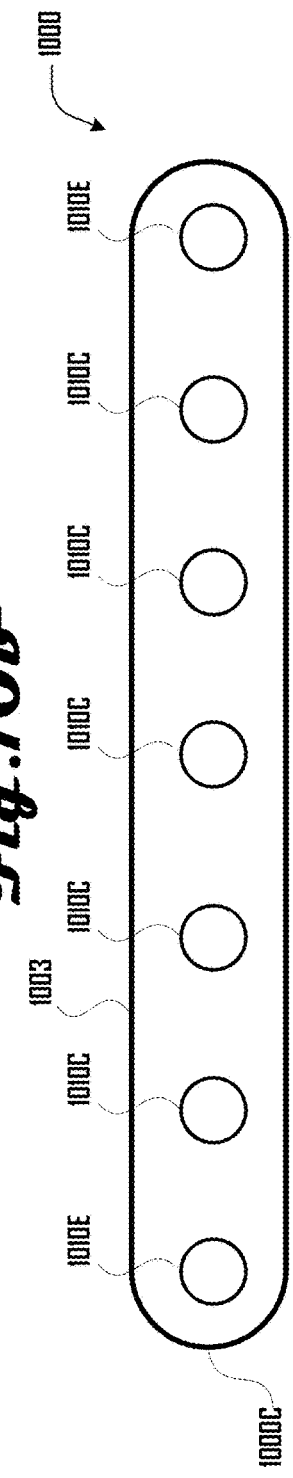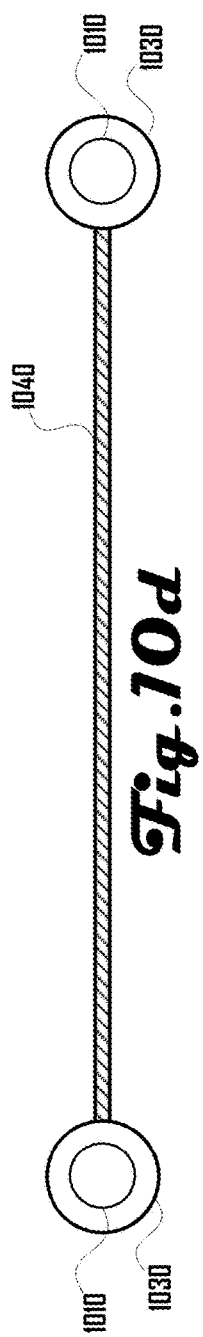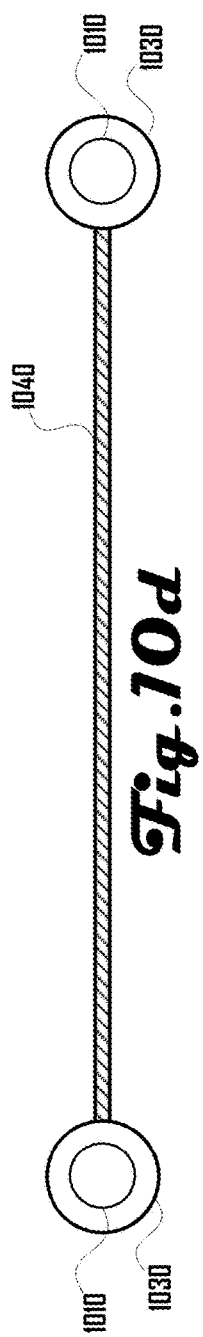

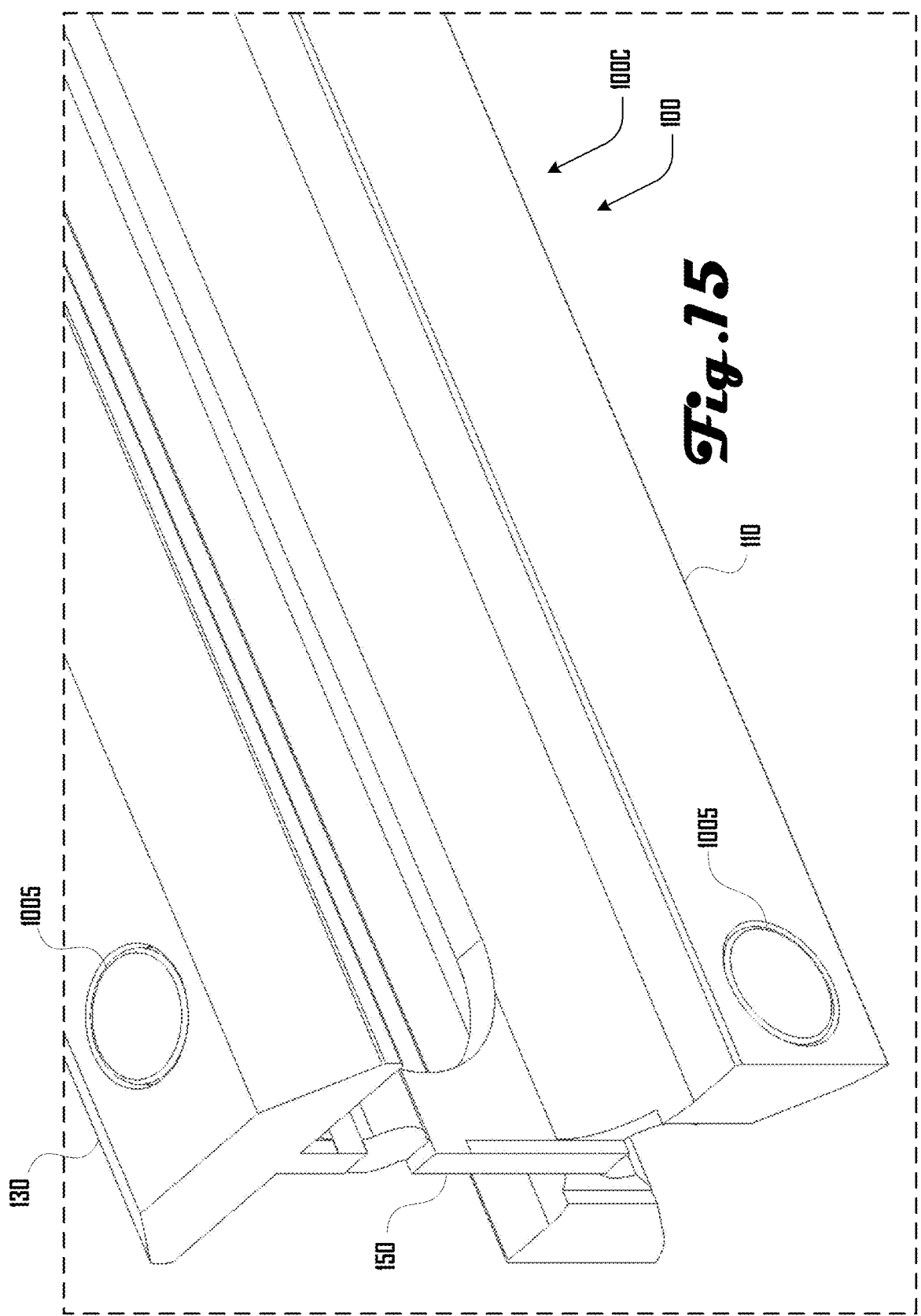

LEVELING AND POSITIONING SYSTEM AND METHOD

RELATED APPLICATIONS

This application is a non-provisional of and claims priority to U.S. provisional Application No. 62/569,263, filed Oct. 6, 2017.

This application is also a continuation-in-part of and claims priority to U.S. Non-provisional application Ser. No. 15/900,659, filed Feb. 20, 2018, which is a continuation-in-part of and claims priority to U.S. Non-provisional application Ser. No. 15/259,997, filed Sep. 8, 2016, (issued as U.S. Pat. No. 9,909,867) which is a continuation-in-part of and claims priority to U.S. Non-provisional application Ser. No. 14/259,865 filed Apr. 23, 2014, which is a continuation-in-part of U.S. Non-provisional application Ser. No. 13/212,989 filed Aug. 18, 2011, (issued as U.S. Pat. No. 8,959,784) which is a continuation-in-part of U.S. Non-provisional application Ser. No. 12/724,326 filed on Mar. 15, 2010 (issued as U.S. Pat. No. 8,006,397) that claims the benefit of priority of U.S. Provisional Application No. 61/159,968 filed on Mar. 13, 2009 (now expired).

This application is also related to application Ser. No. 13/623,781 filed Sep. 12, 2012 (issued as U.S. Pat. No. 8,869,412). All of these applications are incorporated herein by reference in their entireties for all purposes.

BRIEF DESCRIPTION OF DRAWINGS

FIGS. 1a, 1b, 2, 3a, 3b, 3c, 4a, 4b, 5 and 6 illustrate one example level housing in accordance with one embodiment where the level housing extends along an axis X and includes an axis of symmetry about axis Y, with a first and second flange and a web that extends between the flanges.

FIGS. 7a, 7b, 7c, 8, 9a and 9b illustrate another embodiment of a level housing that extends along an axis X and includes an axis of symmetry about axis Y, with a first and second flange and a web that extends between the flanges.

FIGS. 10a, 10b, 10c, 10d, 11, 12 and 13, illustrate examples of level coupling wraps in accordance with an embodiment.

FIGS. 14 and 15 illustrate a further embodiment of a level housing that comprises a plurality of elastic magnetic ligaments disposed within holes defined by the level housing.

DESCRIPTION

Figure 1:
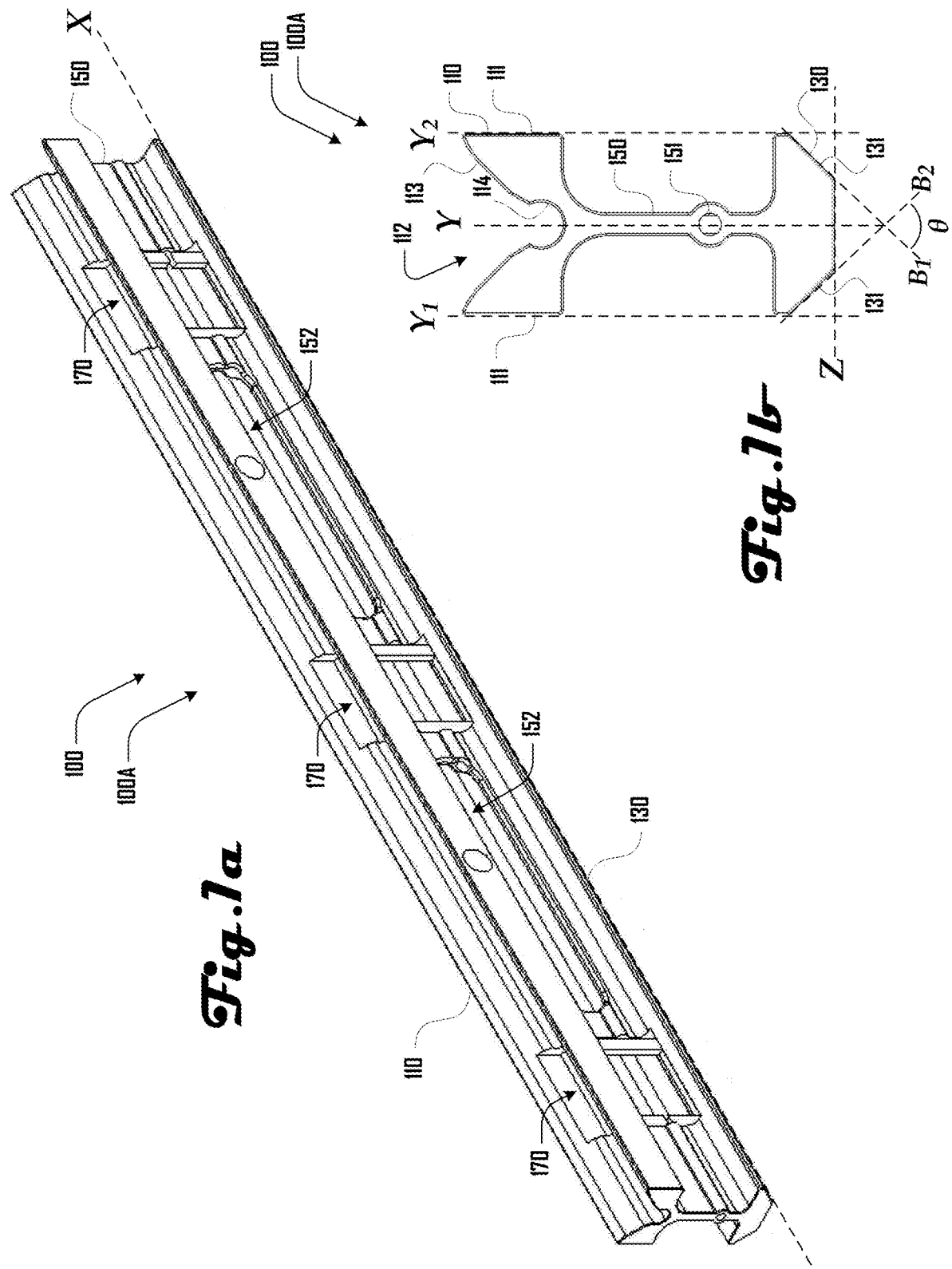
Figure 2:
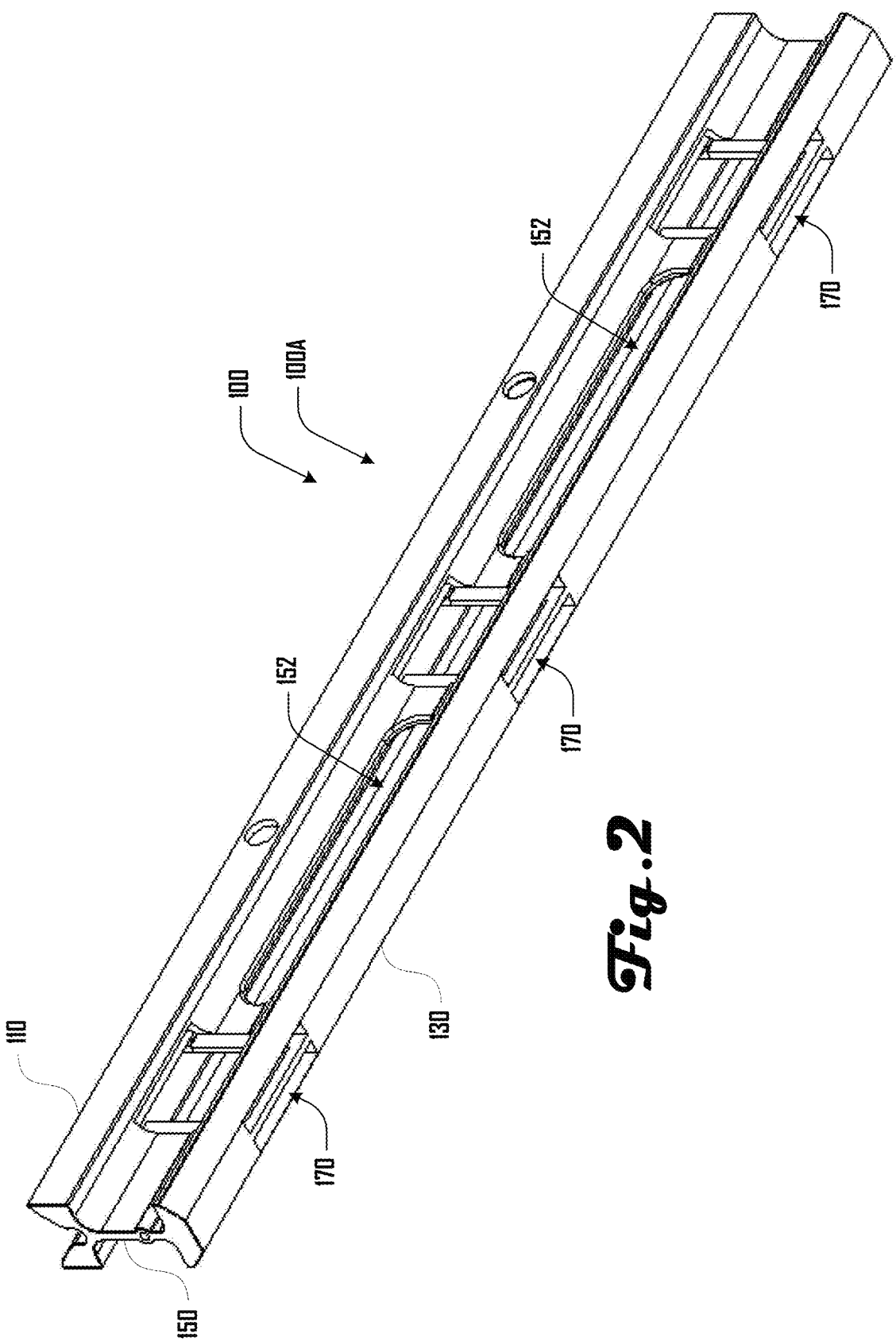
Figure 4A:
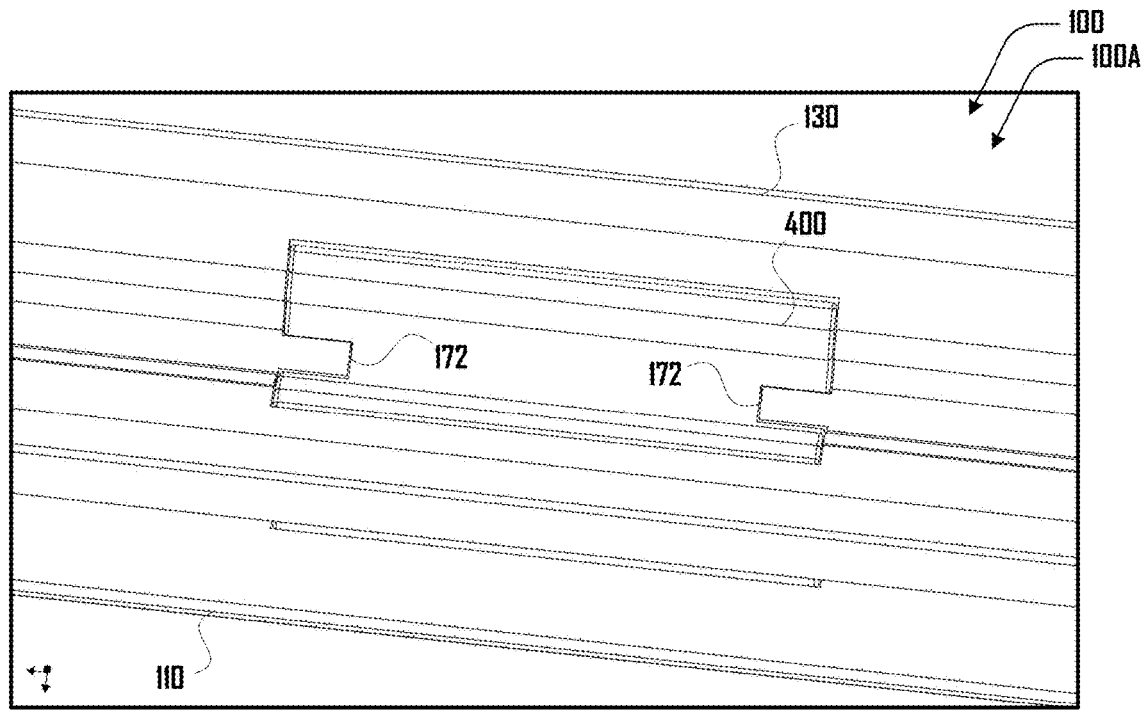
Figure 4B:
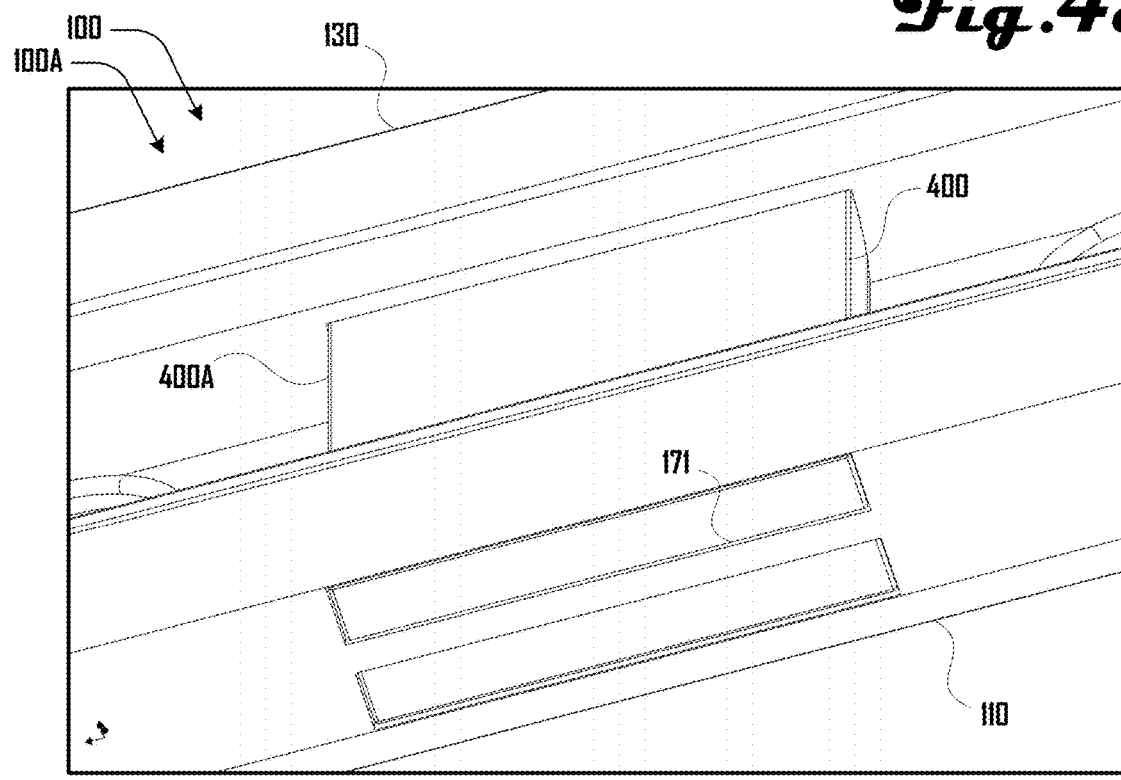
Figure 5:
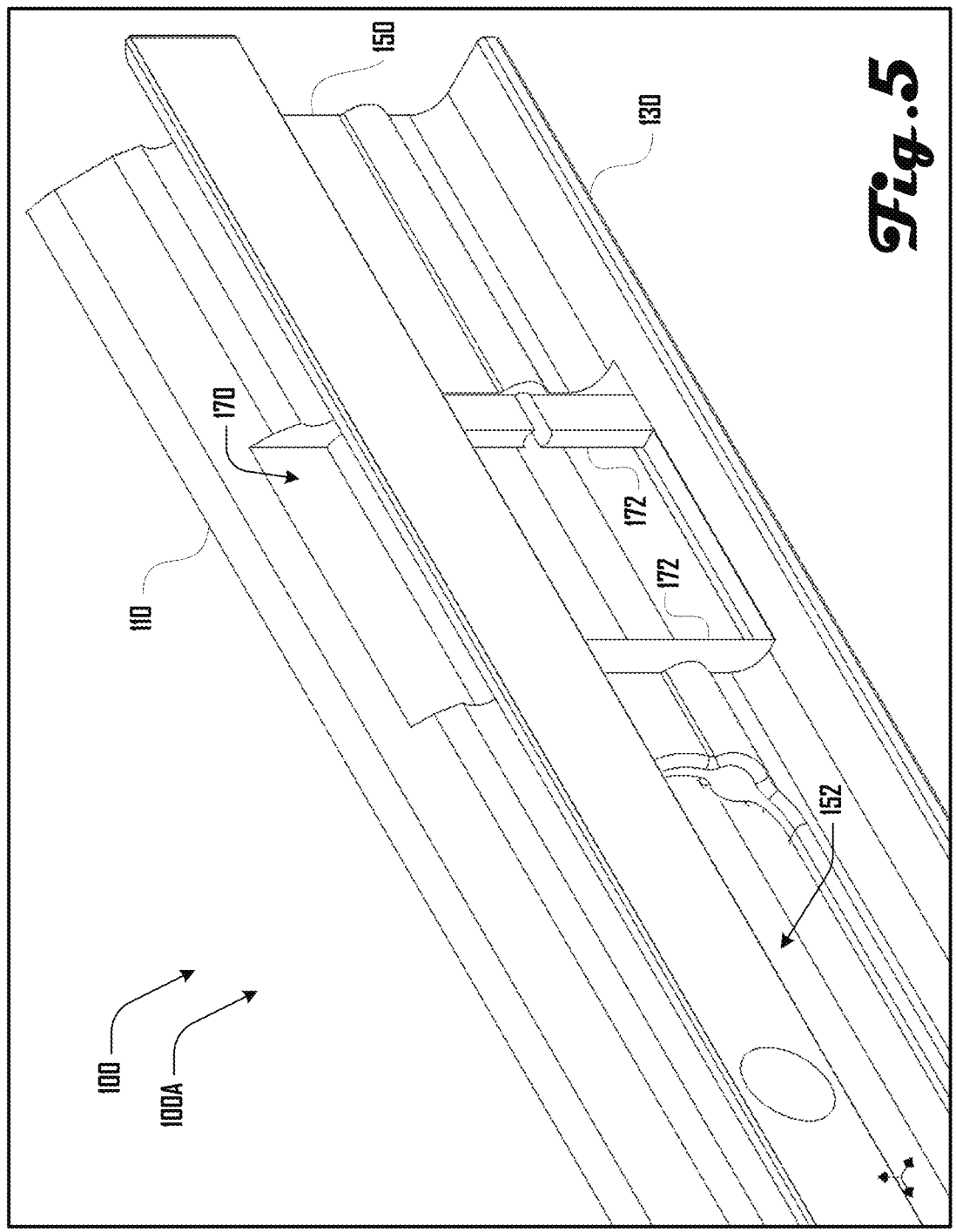
Figure 6:
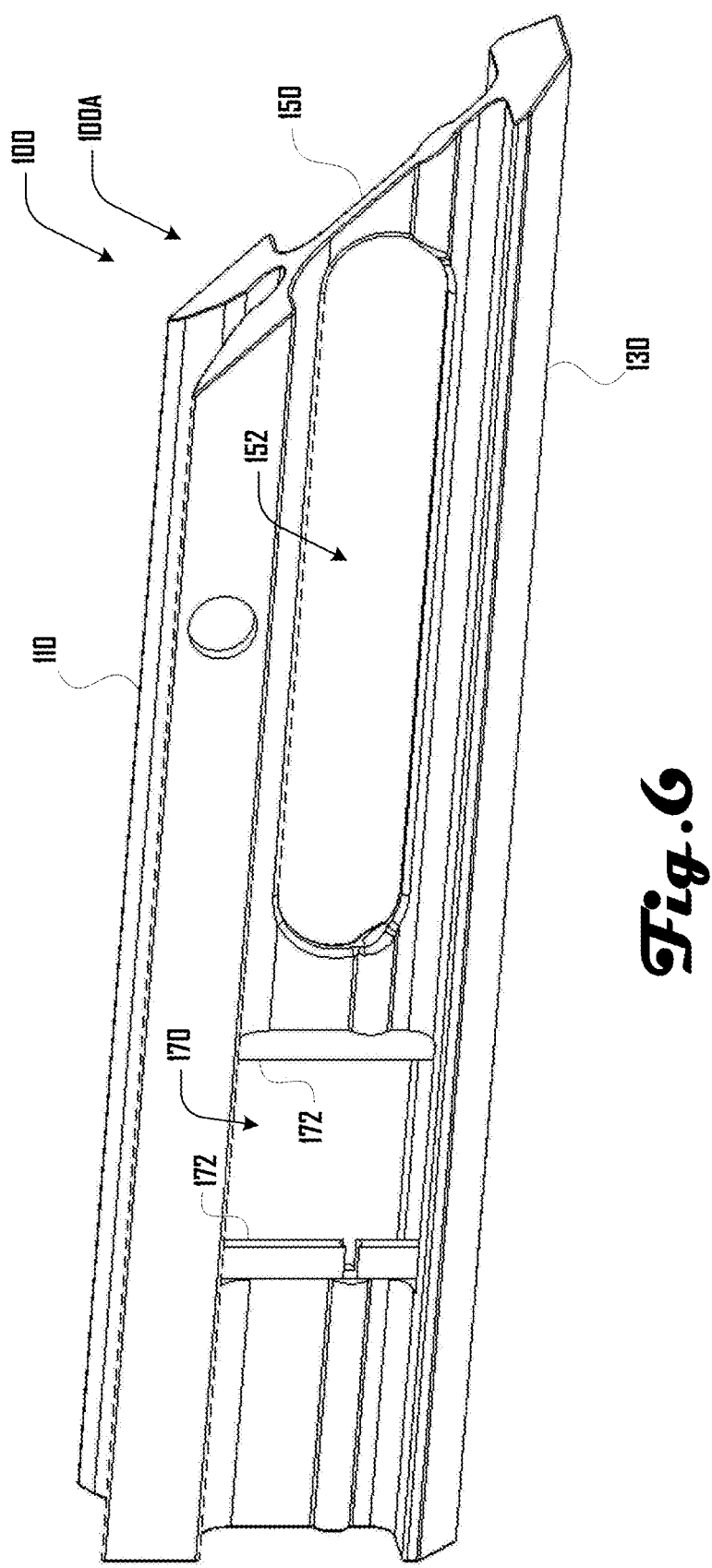

FIGS. 1a, 1b, 2, 3a, 3b, 3c, 4a, 4b, 5 and 6 illustrate one example level housing 100 in accordance with one embodiment 100A. As shown in FIGS. 1a and 1b, the level housing 100 extends along an axis X and includes an axis of symmetry about axis Y. The level housing 100 includes a first and second flange 110, 130 and a web 150 that extends between the flanges 110, 130.

The first flange 110 comprises a pair of first arms 111 that extend from the web 150 and the first arms 111 define a coupling slot 112 including coupling faces 113 and a channel 114. The first flange 110 and first arms 111 are symmetrical about axis Y.

The second flange 130 includes a pair of second arms 131 that can be planar and disposed relative to each other at angle θ. In various embodiments, it can be desirable for angle θ to be substantially 90° such that the second flange 130 can engage with 45° corners of a workpiece or other object. In some examples, at least a portion of the faces 113 of the first flange 110 can be disposed relative axis Y at 45°.

The second flange 130 can further include a planar face disposed along axis Z, which is perpendicular to axis Y. The second flange 130 and second arms 131 are symmetrical about axis Y.

The first and second flanges 110, 130 extend laterally from the web 150 to respective planes $Y_1$ and $Y_2$. In the example embodiment 100A, as shown in FIG. 1b, the first and second flanges 110, 130 can include planar faces that are respectively disposed along planes $Y_1$ and $Y_2$. Such a configuration can be desirable for engaging objects in an orientation such that plane or axis Y is parallel to the face of the object being engaged.

In some embodiments, the web 150 can comprise a port 151. In some embodiments, the port 151 can include a housing for various devices including a laser, or the like. In such embodiments, the level housing 100 can include one or more laser disposed at one or both ends of the level housing and the one or more lasers can be configured to extend parallel to axis X.

The level housing 100 can also include a plurality of coupling sockets 170 defined by a portion of the web 150 and flanges 110, 130. However, some embodiments can include only a single socket. In the example embodiment 100b, the coupling sockets 170 can include a respective cavity that extends between the flanges 110, 130.

As shown in the example embodiment 100A, the coupling sockets 170 can include a stop 171 and coupling rails 172. For example, the stop 171 can comprise a bar that extends within a coupling socket 170, which can be proximate to an opening of the socket 170 proximate to one of the flanges 110, 130. The coupling rails 172 can comprise structures that extend into a coupling socket 170. Additionally, ports 152 can be defined by and extend along a length of web 150.

FIGS. 7a, 7b, 7c, 8, 9a, 9b illustrate another embodiment 100B of a level housing 100. As shown in FIGS. 7a and 7b, the level housing 100B extends along an axis X and includes an axis of symmetry about axis Y. The level housing 100B includes a first and second flange 710, 730 and a web 750 that extends between the flanges 710, 730.

The first flange 710 comprises a pair of first arms 711 that extend from the web 750 and the first arms 711 define a coupling slot 712 and define coupling faces 713 and define a channel 714. The first flange 710 and first arms 711 are symmetrical about axis Y. Planar faces of the coupling slot 712 can be disposed relative to each other at angle θ, which in some preferred embodiments is an angle of 45° such that the coupling slot 712 can engage with 45° corners of a workpiece or other object. Other portions the arms 711 can have respective planar faces that are disposed along plane Z, which is perpendicular to plane or axis Y. The second flange 730 includes a pair of second arms 731 that can be rounded and extend from the web 750. The first and second flanges 710, 730 extend laterally from the web 750 to respective planes $Y_1$ and $Y_2$. Such a configuration can be desirable for engaging objects in an orientation such that plane or axis Y is parallel to the face of the object being engaged.

The level housing 100B can also include a plurality of coupling sockets 770 defined by a portion of the web 750 and flanges 710, 730. In the example embodiment 100B, the coupling sockets 770 can include a respective cavity that extends between the flanges 710, 730. As shown in the example embodiment 100A, the coupling sockets 770 can include coupling slots 772. Additionally, ports 752 can be defined by and extend along a length of web 750.

Although two embodiments 100A, 100B are illustrated herein, it should be clear that various alternative embodiments are within the scope and spirit of the present disclosure and that the example embodiments 100A, 100B should not be construed to be limiting on the wide variety of alternative embodiments contemplated. For example, further embodiments can interchangeably include elements of embodiments 100A, 100B or elements of other embodiments that are disclosed in documents that are incorporated by reference herein. Additionally, the absence of elements is also interchangeable among such example embodiments and the presence or absence of elements in one embodiment should not be construed as being limiting on the presence or absence of such elements in other embodiments.

In various embodiments, a leveling device 400 can be configured to couple with one or more coupling sockets 170, 770 of a level housing 100. For purposed of illustration, coupling of one or more leveling device 400 with the embodiment 100B of a level housing is discussed, but this should not be construed to be limiting on application of such teaching to any suitable embodiment of a level housing 100, or the like, that is within the scope and spirit of the present disclosure or disclosures that are incorporated by reference herein.

FIG. 7c illustrates a leveling device 400 in accordance with one embodiment 400B, which is configured to couple with the sockets 770 of the level housing 100B. The leveling device 400B can include a first and second end 401, 402 with coupling rails 403 extending from sides of the leveling device 400B.

As shown in FIGS. 7a, 8, 9a and 9b, leveling devices 400B can be configured to reside within the sockets 770 and conform to the contours of the flanges 710, 730. Specifically the structure of first end 401 can be configured to correspond to the contours of the first flange 710 and the structure of the second send 402 can be configured to correspond to the contours of the second flange 730. Additionally, the coupling rails 403 can be configured to correspond to the coupling slots 772 of the sockets 770. In various embodiments, the leveling device 400B can be configured to be snugly held within the socket 770 in a desired orientation such that leveling and positioning measurements made with the leveling devices 400B and level housing 100 can be more accurate.

A configuration where the ends 401, 402 of the leveling device 400 respectively correspond to the contours of the flanges 710, 730 can be desirable because this can allow one or more leveling devices 400 associated with a level housing 100 to engage workpieces and objects as the level housing 100 does such that leveling and positioning measurements made with the one or more leveling devices 400 and level housing 100 can be more accurate.

In embodiments of a level housing 100 having a plurality of sockets 770, the sockets 770 can be configured such that a given leveling device 400 can be interchangeably disposed within any of the sockets 770. Additionally, in various embodiments a leveling system can comprise a level housing 100 and a plurality of leveling devices 400 that can be interchangeably disposed within any of the sockets 770.

In some embodiments, the leveling device 400 can have symmetry such that it can be inserted into the sockets 700 in two or more orientations with the ends 401, 402 still corresponding to the flanges 710, 730. However in some embodiments, the leveling device 400 can be configured such that the leveling device can only be properly inserted into the sockets 700 with a single orientation with the ends 401, 402 still corresponding to the flanges 710, 730.

In various embodiments, the leveling device 400 can have one or more capabilities of leveling devices, or the like, as described in the applications which are incorporated herein by reference or described herein, or one or more of such functionalities can be absent.

Additionally, in various embodiments, two or more leveling devices 400 can be configured to communicate in various ways, including via a wireless communication protocol or via wired communication (e.g., via wires disposed within the level housing 100). Such communication between or among a plurality of leveling devices 400 can be used to generate a sensing array, which in one example can be desirable for obtaining an average of level position sensing measurements or other suitable sensing measurements so that such sensing measurements can be more accurate.

Also, where a plurality of sockets 770 are disposed along a length of a level housing 100, a location identity of the socket 770 can be determined by the leveling device 400 being inserted into a given socket 770. For example, by inserting a leveling device 400 into one of the three sockets 770, the leveling device 400 can determine whether the leveling device 400 is present within the first, second or third socket 770. Alternatively, by inserting a leveling device 400 into one of the three sockets 770, the leveling device 400 can determine whether the leveling device 400 is present within an outer socket 770 or the inner socket 770.

Additionally, in some embodiments, a leveling system can include blanks that can be inserted into the sockets 770. In other words, a non-functional blank having the same or similar shape to a leveling device can be inserted into one or more sockets 770 instead of a functional leveling device 400.

As shown in the example embodiment 100B, the socket 770 can be configured to allow the leveling device 400B to be inserted into the socket 770 via an opening in the first or second flange 710, 730. However in some embodiments, sockets 770 can be configured such that the leveling device 400B can only be inserted into an opening at only one of the first or second flange 710, 730. For example, the sockets 170 of the level housing embodiment 100A are shown including a stop 171 that prevents the leveling device 400A from being inserted into an opening at the second flange 130, whereas the leveling device 400A can be inserted into an opening at the first flange 110.

While two examples of leveling devices 400A, 400B are shown that are respectively configured to couple with sockets 170, 770, these examples should not be construed to be limiting on the wide variety of shapes and configurations that corresponding sockets and leveling devices can have. Accordingly, the examples shown herein should not be construed to be limiting on features of one or both example embodiments can be present or specifically absent in further embodiments.

Turning to FIGS. 10a, 10b, 10c, 10d, 11, 12 and 13, examples of a level coupling wraps 1000 are illustrated. For example, FIG. 10a illustrates a first example embodiment 1000A that comprises first and second end-magnets 1010E disposed at respective ends 1001, 1002 of a wrap body 1003.

FIG. 10b illustrates a second example embodiment 100B that comprises a first and second end-magnets 1010E disposed at respective ends 1001, 1002 of a wrap body 1003 with a magnetic strip 1020 disposed between the first and second end-magnets 1010E disposed at respective ends 1001, 1002 of a wrap body 1003.

FIG. 10c illustrates a third example embodiment 100C that comprises first and second end-magnets 1010E disposed at respective ends 1001, 1002 of a wrap body 1003 with a plurality of central magnets 1010C disposed between the first and second end-magnets 1010E disposed at respective ends 1001, 1002 of a wrap body 1003.

The wrap body 1003 can be made of various suitable materials, including elastic, non-elastic or semi-elastic materials. The magnets 1010E, 1010C, 1020 can be any suitable magnetic materials, including neodymium magnets or the like. In some embodiments, some of the magnets 1010E, 1010C, 1020 can be replaced with magnetically receptive members, such as iron, or the like. Also, while specific shapes (e.g. circular or rectangular) are illustrated, further embodiments can include magnets 1010E, 1010C, 1020 of other shapes and can include any suitable number of magnets 1010E, 1010C, 1020 in any suitable configuration.

In various embodiments, the wrap body 1003 can comprise a flat planar sheet with the magnets 1010E, 1010C, 1020 imbedded within the wrap body 1003 such that the magnets 1010E, 1010C, 1020 are not directly externally exposed. For example, the magnets 1010E, 1010C, 1020 can be disposed between a pair of planar sheets that define the wrap body 1003.

FIG. 10d illustrates an example of an elastic magnetic ligament 1005 in accordance with one embodiment that includes magnets 1010 disposed at heads 1030 that are coupled via a ligament 1040. In some embodiments, the magnets 1010 can be disposed within the heads (e.g., between planar sheets of material) or can be disposed on an open face of the heads 1010. The ligament 1040 can comprise various suitable materials, including any suitable elastic material as described herein. The ligaments can be any suitable size, length or shape in various embodiments. In further embodiments, the elastic magnetic ligament 1005 can comprise any suitable number of heads, including 1, 2, 3, 4 or the like. The elastic magnetic ligament 1005 can be used like level coupling wraps 1000 as described herein, or can be used as shown in FIGS. 14 and 15 as described in more detail below.

Figure 11:
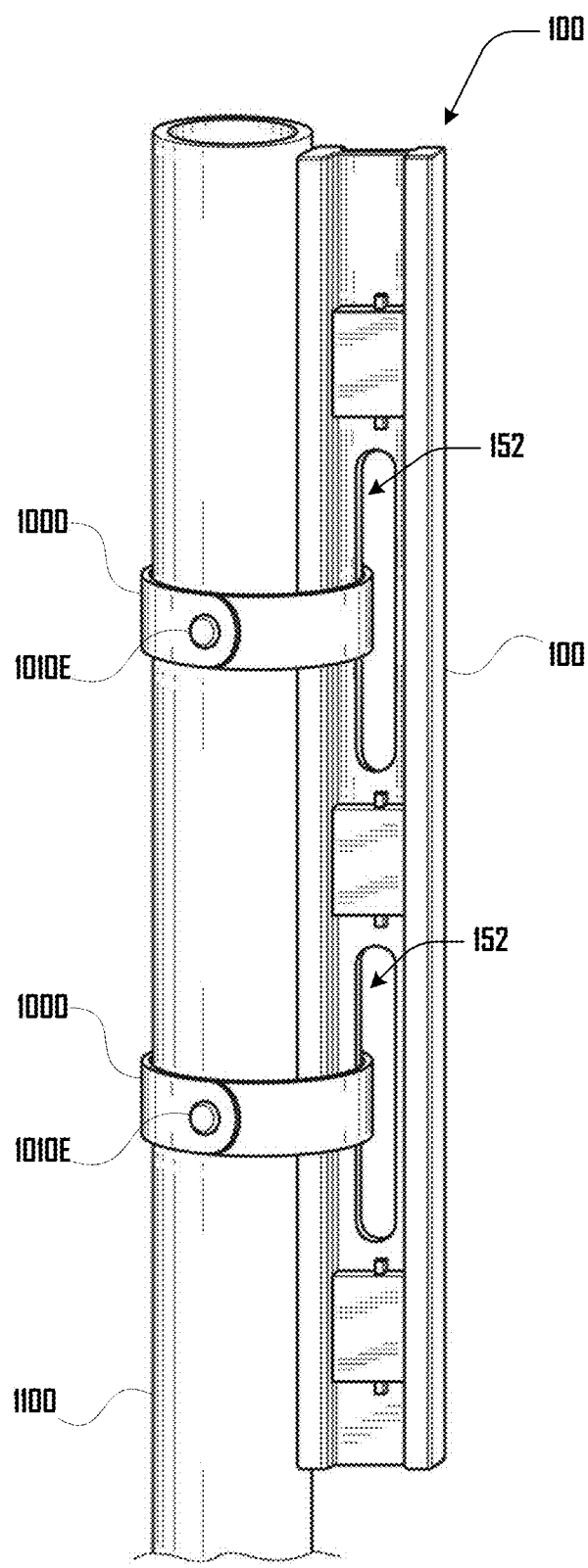
Figure 12:
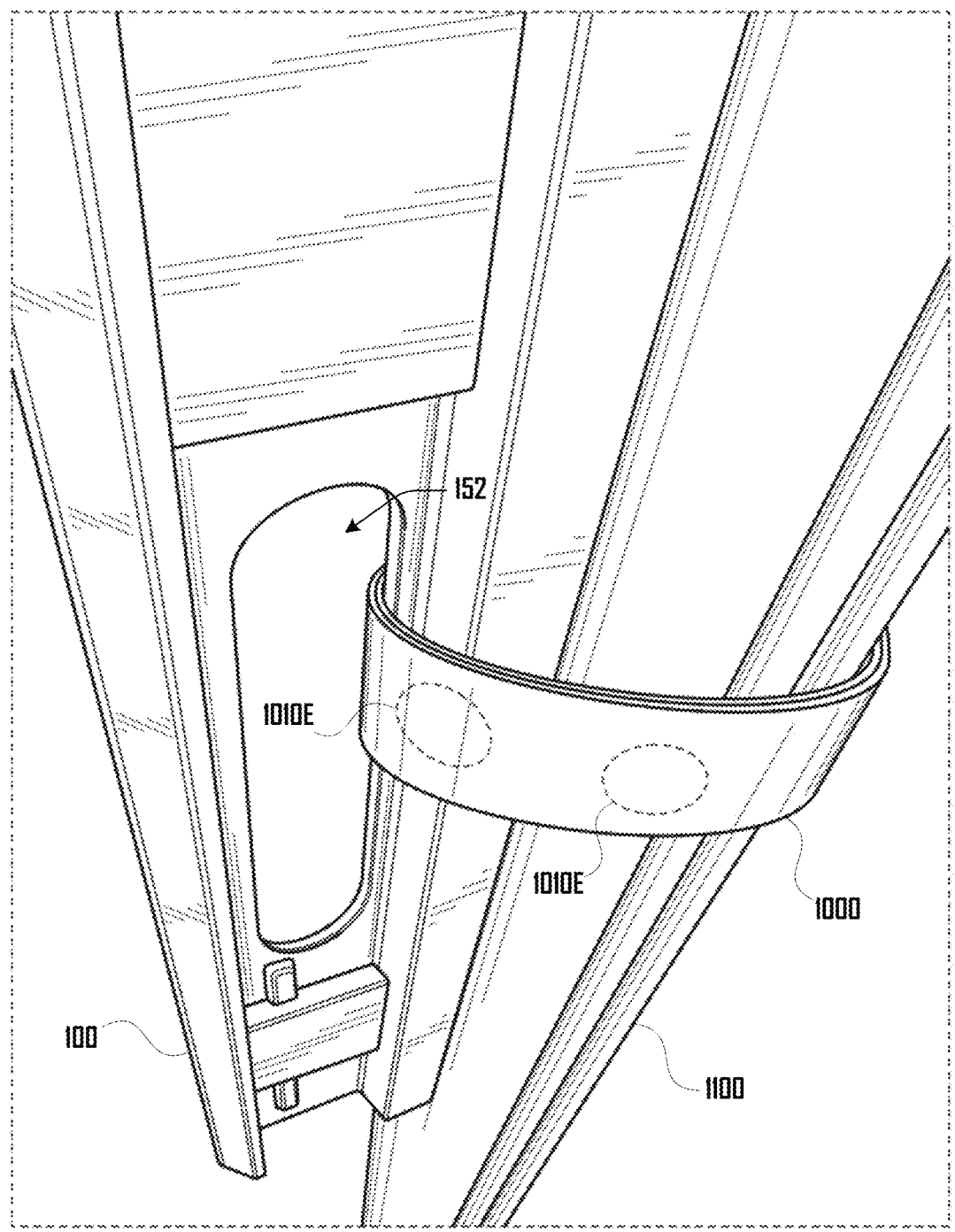
Figure 13:
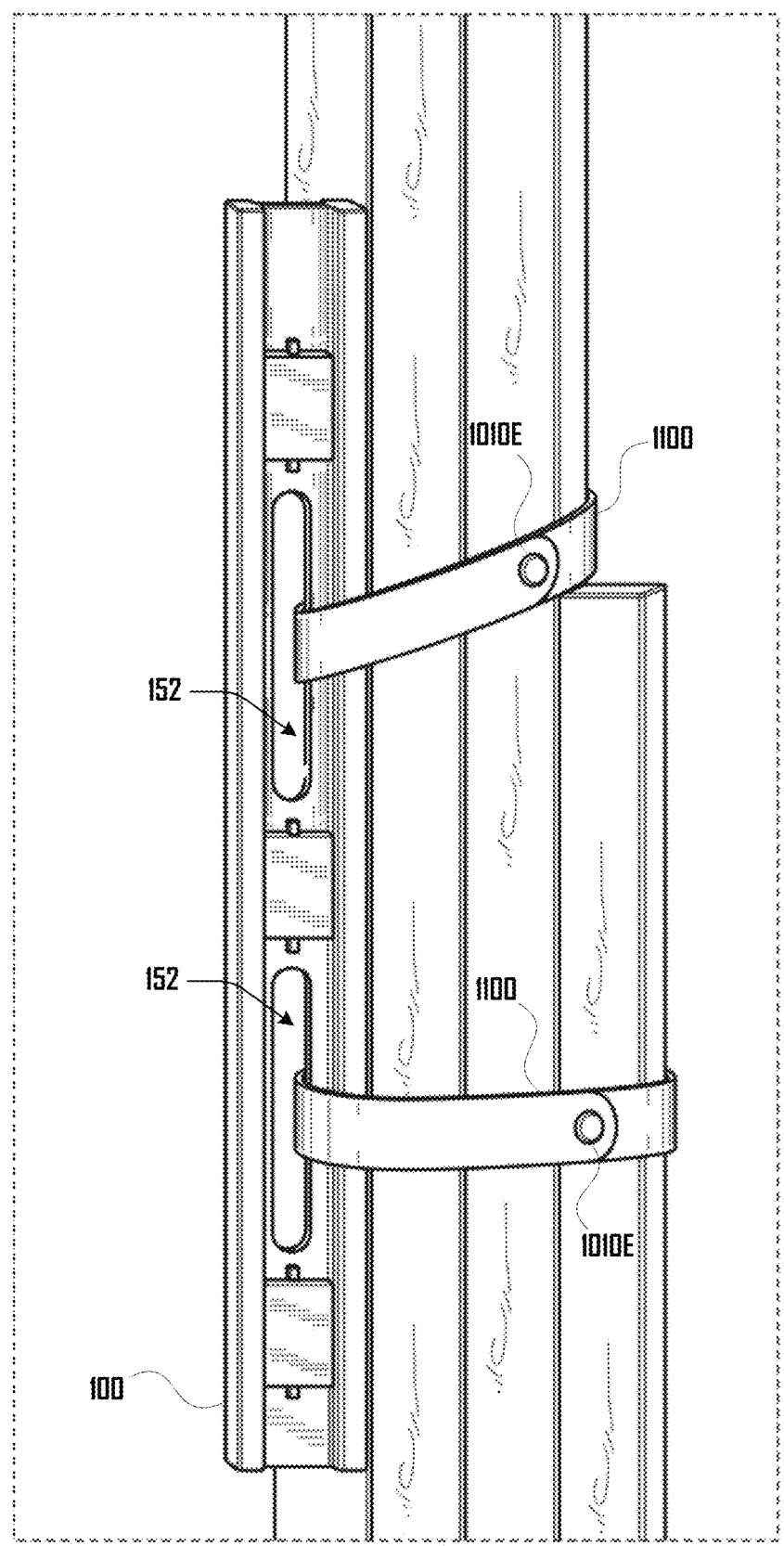

Turning to FIGS. 11-13, one or more level coupling wraps 1000 are illustrated coupling a level housing 100 to various poles 1100. As shown in these examples, one or more level coupling wraps 1000 encircle the pole 1100 and extend through ports 152 of the level housing 100 with at least one pair of magnets 1010E, 1010C, 1020 being magnetically coupled to hold the level housing 100 in place.

In further embodiments, a coupling wrap 1000 can be configured to magnetically couple with other structures to hold a level housing 100 against a pole 1100 or against any other suitable object. For example, some embodiments can include one or more suction cup having a magnet or magnetically receptive member disposed thereon and the coupling wrap 1000 can magnetically couple with the magnet or magnetically receptive member of the one or more suction cup.

Figure 14:
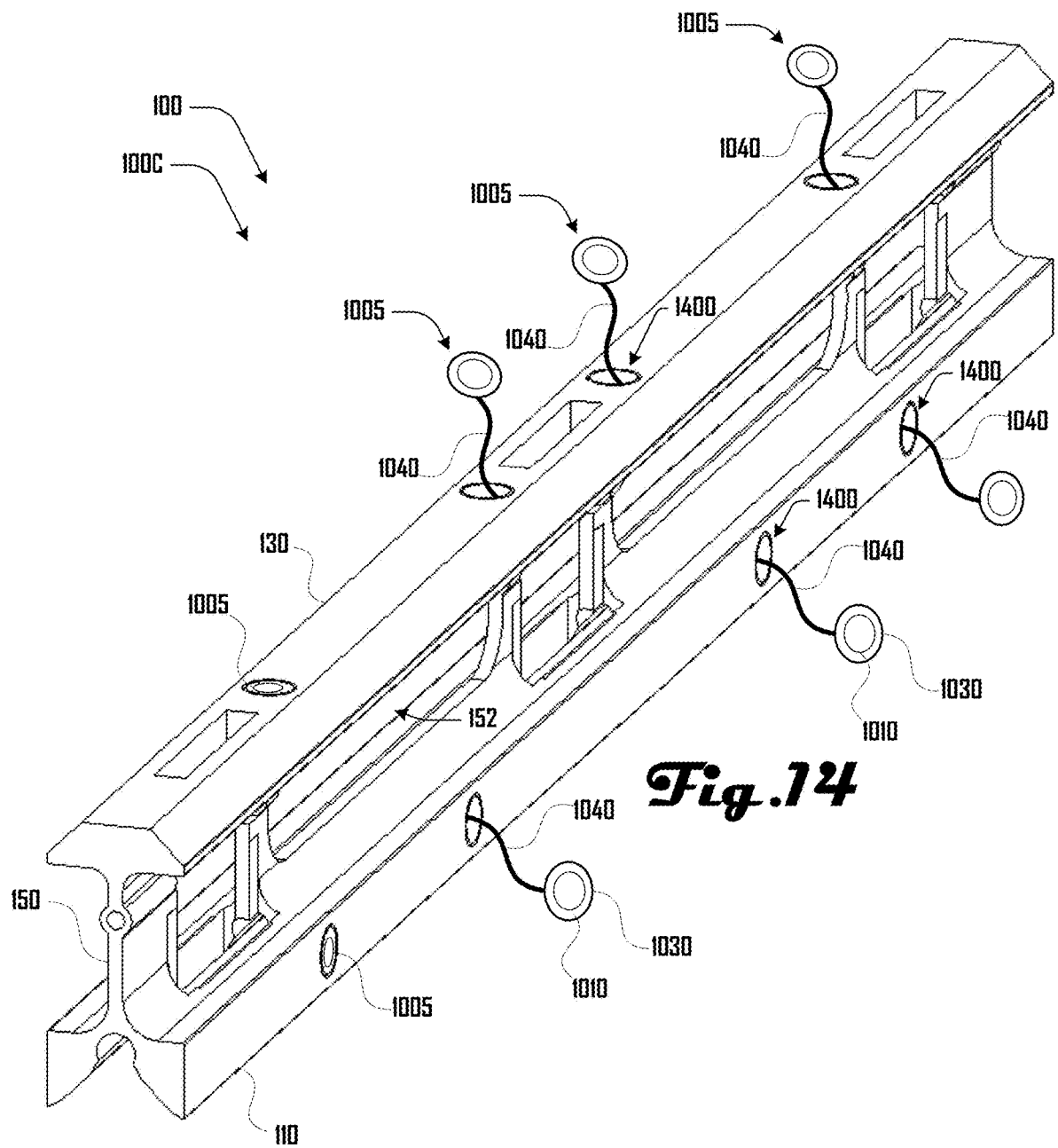

FIGS. 14 and 15 illustrate a further embodiment 100C of a level housing 100 that comprises a plurality of elastic magnetic ligaments 1005 disposed within holes 1400 defined by the level housing 100. As shown in the example of FIG. 14, the heads 1030 and ligaments 1040 of the elastic magnetic ligaments 1005 can be removably disposed within the holes 1400. The ligaments 1040 can be anchored to the level housing 100 within the holes 1400 or can be coupled to pairs of adjacent heads 1030 (e.g., as shown in FIG. 10d).

In various embodiments, the heads 1030 can be configured to be coupled within the holes 1400 flush to or sunk within with faces of the level housing 100 that define the holes 1400. As shown in the examples of FIGS. 14 and 15, the holes can be defined by first arms 111 of the first flange 110 and a central face of the second flange 130. However, in further embodiments, holes 1400 can be defined by and disposed on any suitable portion of a level housing 100. Additionally, any suitable number of holes 1400 can be defined by the level housing 100 with any suitable number of associated elastic magnetic ligaments 1005.

The elastic magnetic ligaments 1005 can be used to couple the level housing 100 to various objects via the magnets 1010, ligaments 1040, and/or heads 1030. For example, magnets 1010 can couple to metallic portions of an object, magnets 1010 associated with other heads 1030, magnets on suction cups, and the like. For example, elastic magnetic ligaments 1005 can be desirable for attaching the level housing 100 in non-flat 3d situations where alignment of an axis is important, which is not lying on a flat plane of an object (e.g., a public sculpture).

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives. For example, while some embodiments are related to aftermarket products configured to couple with various commercially available level housings, further embodiments can include a standalone device with any suitable combination of such functionalities described or shown herein. In other words, functionalities and/or components described herein related to aftermarket devices can also be present in non-aftermarket devices in further embodiments.

Additionally, although specific embodiments have been illustrated and described herein, it will be appreciated by those of ordinary skill in the art and others, that a wide variety of alternate and/or equivalent implementations may be substituted for the specific embodiment shown in the described without departing from the scope of the embodiments described herein. This application is intended to cover any adaptations or variations of the embodiment discussed herein. While various embodiments have been illustrated and described, as noted above, many changes can be made without departing from the spirit and scope of the embodiments described herein. For example, various embodiments described and shown herein can be suitably combined, so separate illustration of various elements and embodiments should not be construed as necessarily being separate in other embodiments.

What is claimed is:

1. A leveling assembly comprising:
    a pole;
    a plurality of separate level coupling wraps that encircle the pole, the level coupling wraps including first and second end-magnets disposed at respective ends of a wrap body with a plurality of central magnets disposed between the first and second end-magnets, the first end-magnet magnetically coupled to at least one of the second end magnet or one of the central magnets to encircle the pole;
    an electronic leveling system coupled to the pole, the electronic leveling system including:
        a level housing that extends along an axis X and that includes an axis of symmetry about an axis Y that is perpendicular to the axis X, the level housing including:
            a first and second flange and a web that extends between the flanges, the first flange comprising a pair of first arms that extend from the web and the first arms defining a coupling slot that includes coupling faces and a channel, the first flange and first arms being symmetrical about axis Y, the second flange including a pair of planar second arms disposed relative to each other at an angle of substantially 90° such that the second flange can engage with 45° corners of a workpiece, the second flange further including a planar face disposed along an axis Z, which is perpendicular to the axis Y and axis X, the second flange and second arms being symmetrical about the axis Y, the first and second flanges extending laterally from the web to respective parallel planes Y1 and Y2 with the first and second flanges including planar faces that are respectively disposed along parallel planes Y1 and Y2, a port defined by the web, the port holding a laser that extends a laser beam parallel to axis X, a plurality of coupling sockets defined by a portion of the web and flanges, the coupling sockets including a respective cavity that extends between the flanges, the coupling sockets including a stop and socket coupling rails, with the stop comprising a bar that extends within the respective coupling socket proximate to an opening of the respective coupling socket proximate to one of the flanges, a plurality of ports defined by and extending along a length of web, with a respective separate level coupling wrap extending through a respective one of the plurality of ports to couple the level housing to the pole; and a plurality of elastic magnetic ligaments disposed within holes defined by the level housing, the elastic magnetic ligaments each including heads and ligament strings removably disposed within the holes, the ligament strings anchored to the level housing within the holes; and a plurality of electronic leveling devices coupled within respective sockets of the level housing, the leveling devices including a first and second end with device coupling rails extending from sides of the leveling device and conforming to contours of the socket coupling rails, the leveling devices snugly held within a respective one of the sockets in a known orientation such that leveling and positioning measurements made with the leveling devices and level housing can be calculated, the plurality of leveling devices configured to be interchangeably disposed within any of the sockets.

2. The leveling assembly of claim 1, wherein the leveling devices comprise computing devices configured to determine and report a level status and position status of the respective leveling devices.

3. The leveling assembly of claim 1, wherein the leveling devices communicate via a wireless communication protocol to generate a sensing array to at least generate an average of level position sensing measurements made by the respective leveling devices.

4. An electronic leveling system comprising:
a level housing that extends along an axis X and includes an axis of symmetry about an axis Y that is perpendicular to the axis X, level housing including:
a first and second flange and a web that extends between the flanges, the first flange comprising a pair of first arms that extend from the web and the first arms defining a coupling slot that includes coupling faces and a channel, the first flange and first arms being symmetrical about axis Y, the second flange including a pair of planar second arms disposed relative to each other at an angle of substantially 90° such that the second flange can engage with 45° corners of a workpiece, the second flange further including a planar face disposed along an axis Z that is perpendicular to the axis Y and axis X, the second flange and second arms being symmetrical about the axis Y, the first and second flanges extending laterally from the web to respective planes Y1 and Y2 with the first and second flanges including planar faces that are respectively disposed along planes Y1 and Y2, and a plurality of coupling sockets defined by a portion of the web and flanges, the coupling sockets including a respective cavity that extends between the flanges; and one or more electronic leveling devices coupled within one or more respective sockets of the level housing, the one or more leveling devices snugly held within a respective socket in a known orientation such that leveling and positioning measurements made with the one or more leveling devices and level housing can be calculated.

5. The electronic leveling system of claim 4, wherein the level housing further comprises a port defined by the web, the port holding a laser configured to extend a laser beam parallel to axis X.

6. The electronic leveling system of claim 4, wherein the level housing further includes a plurality ports defined by and extending along a length of web.

7. The electronic leveling system of claim 4, wherein the level housing further includes a plurality of elastic magnetic ligaments disposed within holes defined by the level housing, the elastic magnetic ligaments each including heads and ligament strings removably disposed within the holes.

8. The electronic leveling system of claim 4, wherein the coupling sockets include socket coupling rails, and wherein the leveling device includes device coupling rails extending from sides of the leveling device and conforming to contours of the socket coupling rails.

9. The electronic leveling system of claim 4, wherein the one or more leveling device comprises a computing device configured to determine and report a level status of the one or more leveling device.

10. A level housing comprising:
a level housing body that extends along an axis X and includes an axis of symmetry about an axis Y that is perpendicular to the axis X;
a first and second flange and a web that extends between the flanges, the first flange comprising a pair of first arms that extend from the web and the first arms defining a coupling slot that includes coupling faces and a channel, the first flange and first arms and second flange being symmetrical about axis Y, the second flange including a pair of second arms; and
a plurality of coupling sockets defined by a portion of the web and flanges, the coupling sockets including a respective cavity that extends between the flanges.

11. The level housing of claim 10, wherein the second arms are disposed relative to each other at an angle of substantially 90° such that the second flange can engage with 45° corners of a workpiece.

12. The level housing of claim 10, wherein the second flange further includes a planar face disposed along an axis Z that is perpendicular to the axis Y and the axis X.

13. The level housing of claim 10, wherein the first and second flanges extend laterally from the web to respective planes Y1 and Y2 with the first and second flanges including planar faces that are respectively disposed along planes Y1 and Y2.

14. The level housing of claim 10, wherein the one or more coupling sockets are configured such that a plurality of leveling devices are respectively configured to be snugly held within a respective socket in a known orientation with the plurality of leveling devices configured to be interchangeably disposed within any of the sockets.

15. The level housing of claim 10, wherein the level housing comprises a laser configured to extend a laser beam parallel to axis X.

16. The level housing of claim 10, wherein the level housing further includes a plurality ports defined by the web.

17. The level housing of claim 10, wherein the level housing further includes a plurality of elastic ligaments disposed within holes defined by the level housing.

18. The level housing of claim 17, wherein, the elastic ligaments each include heads and ligament strings removably disposed within the holes.

19. The level housing of claim 10, wherein the coupling sockets include socket coupling rails.

\* \* \* \* \*